United States Patent
Ressler et al.

(10) Patent No.: US 9,924,633 B2
(45) Date of Patent: Mar. 27, 2018

(54) MOWER DECK GAUGE WHEEL SUPPORT

(71) Applicant: Deere & Company, Moline, IL (US)

(72) Inventors: Kyle T. Ressler, West Bend, WI (US); Melissa Tolson, Horicon, WI (US); Patrick Shaver, Eden Prairie, MN (US)

(73) Assignee: DEERE & COMPANY, Moline, IL (US)

( * ) Notice: Subject to any disclaimer, the term of this patent is extended or adjusted under 35 U.S.C. 154(b) by 256 days.

(21) Appl. No.: 14/804,998

(22) Filed: Jul. 21, 2015

(65) Prior Publication Data

US 2017/0020068 A1   Jan. 26, 2017

(51) Int. Cl.
*A01D 34/00* (2006.01)
*A01D 34/74* (2006.01)

(52) U.S. Cl.
CPC .................................... *A01D 34/74* (2013.01)

(58) Field of Classification Search
CPC ........ A01D 34/74; A01D 34/54; A01D 34/82; A01D 34/001; Y10T 16/193; Y10T 16/1937; B60B 33/04
USPC ........................................ 56/17.2, 17.1, 322
See application file for complete search history.

(56) References Cited

U.S. PATENT DOCUMENTS

| | | | |
|---|---|---|---|
| 2,287,126 A * | 6/1942 | Packwood | A01D 34/63 56/16.7 |
| 2,485,312 A * | 10/1949 | Powell | A01D 34/62 280/47.15 |
| 3,043,604 A * | 7/1962 | Rehnberg | A01D 34/74 280/43 |
| 3,334,911 A * | 8/1967 | Enters | A01D 34/74 16/19 |
| 3,754,385 A | 8/1973 | Hoffmeyer | |
| 4,106,269 A * | 8/1978 | Knudson | A01D 34/64 56/15.8 |
| 4,313,295 A * | 2/1982 | Hansen | A01D 34/662 56/15.8 |
| 4,942,726 A * | 7/1990 | Bowditch | A01D 34/74 280/43.13 |
| 5,136,829 A | 8/1992 | Sebben et al. | |
| 5,845,471 A | 12/1998 | Seegert et al. | |
| 6,041,584 A | 3/2000 | Hohnl | |
| 6,276,119 B1 * | 8/2001 | Oshima | A01D 34/74 56/15.9 |
| 2006/0254236 A1 | 11/2006 | Goebert et al. | |
| 2007/0028577 A1 | 2/2007 | Clement et al. | |
| 2017/0034996 A1 * | 2/2017 | Kruckeberg | A01D 34/008 |

FOREIGN PATENT DOCUMENTS

| | | | |
|---|---|---|---|
| FR | 2313860 A1 * | 1/1977 | ............. A01D 34/54 |
| JP | H0998631 A | 4/1997 | |
| JP | 3146104 B2 * | 3/2001 | |

OTHER PUBLICATIONS

British Search Report in foreign counterpart application No. GB1611944.8, dated Jan. 3, 2017 (4 pages).

* cited by examiner

*Primary Examiner* — Thomas B Will
*Assistant Examiner* — Joan D Misa

(57) ABSTRACT

A mower deck gauge wheel support includes a one-piece sheet metal bracket mounted to a mower deck, having a sleeve mounted thereto outside a skirt of the mower deck, a wheel shaft inserted through the sleeve, and a J-pin having a first end that engages the wheel shaft at a desired cutting height, and a second end that is engaged by and retained by a coil spring within the bracket.

13 Claims, 3 Drawing Sheets

MOWER DECK GAUGE WHEEL SUPPORT

FIELD OF THE INVENTION

This invention relates to mower decks and more specifically to a mower deck gauge wheel support.

BACKGROUND OF THE INVENTION

Mower decks used in cutting grass and similar vegetation typically may be provided with one or more gauge wheels which support the decks at predetermined positions above the ground and prevent scalping. Gauge wheels typically are supported by brackets mounted to the top surface and outer wall of the mower deck. Each bracket may include a vertical sleeve where a wheel shaft may be inserted. A gauge wheel may be rotatably attached to a lower end of the wheel shaft. To set the gauge wheel at a desired height, a spring loaded pin may be mounted to the bracket, and the pin may be inserted through one of several holes in the wheel shaft, and through the sleeve. A separate retainer may be fastened or welded to the mower deck or to the bracket for retaining the pin and spring in place in the wheel shaft, and retaining the pin when it is retracted.

Some mower deck gauge wheel supports also are designed for rotation of gauge wheels to a sideways position. The sideways position allows the mower deck to be rolled outward away from the machine. The pin may be pulled out from the holes in the wheel shaft and sleeve. The gauge wheel then may be rotated 90 degrees, and the pin may be aligned with another hole in the wheel shaft at the sideways position. The pin then may be released to lock the gauge wheel shaft to the sleeve at the sideways position.

While the mower deck gauge wheel supports described above are effective for adjusting gauge wheels to desired heights for mowing, and for locking gauge wheels at the sideways position, a mower deck gauge wheel support is needed that has lower cost, lower parts count, and reduced assembly time.

SUMMARY OF THE INVENTION

A mower deck gauge wheel support includes a bracket having an inside wall, an outside wall, and a vertical sleeve attached to the inside and outside walls. A wheel shaft may be inserted into the sleeve and has an upper end with a plurality of vertically spaced holes and a lower end with a gauge wheel mounted thereto. A J-pin has a first leg insertable through one of the holes in the wheel shaft, a second leg insertable through a pair of holes through the inside and outside walls of the bracket, and a spring retaining the second leg of the J-pin in the bracket. The mower deck gauge wheel support enables adjusting gauge wheels to desired heights for mowing, and locking gauge wheels at the sideways position, but eliminates any separate retainer for the pin, resulting in lower cost, lower parts count, and reduced assembly time.

DESCRIPTION OF THE PREFERRED EMBODIMENT

Figure 1:
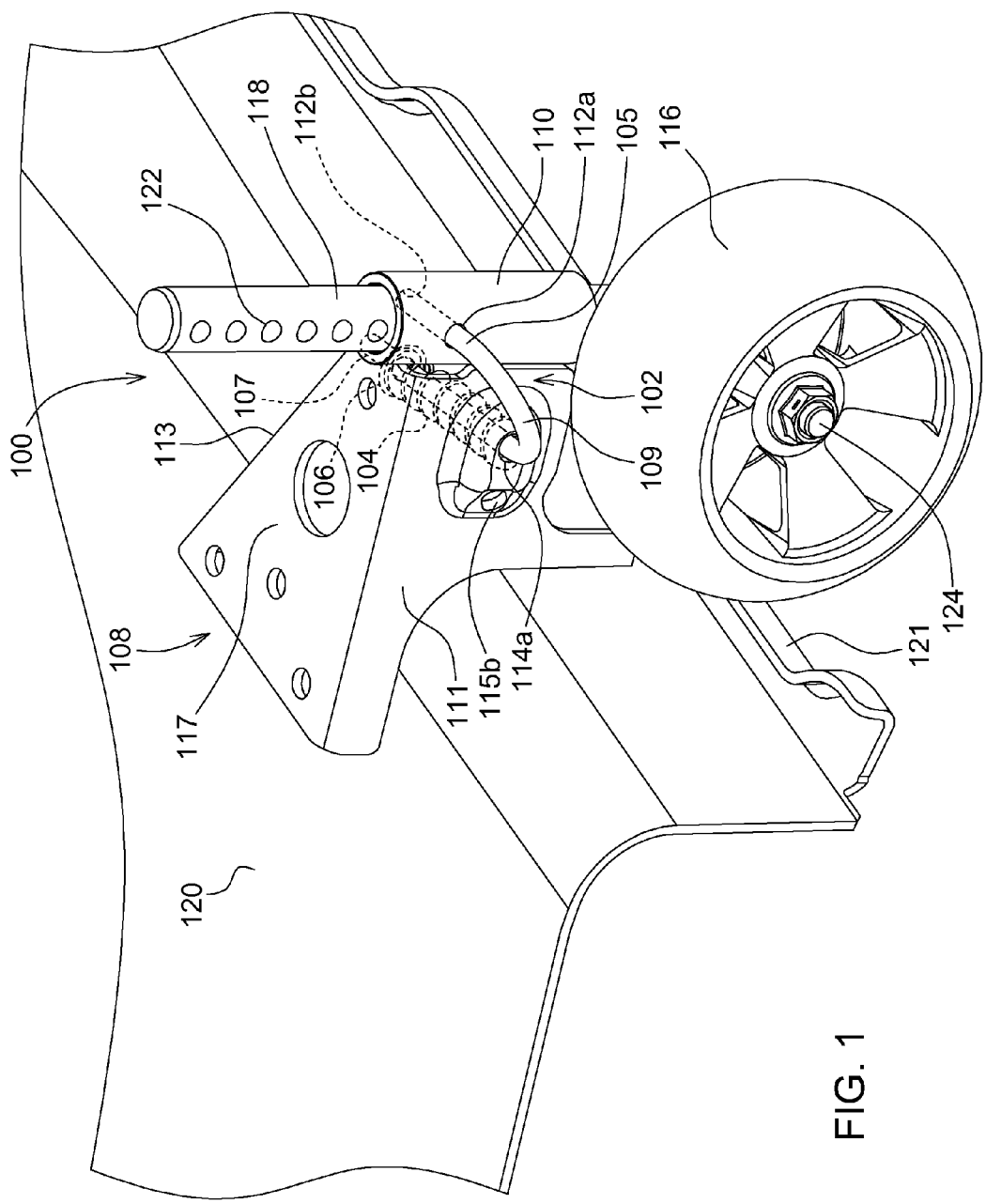
FIG. 1 is a perspective view of a mower deck gauge wheel support installed on a mower deck according to a preferred embodiment of the invention.
Figure 2:
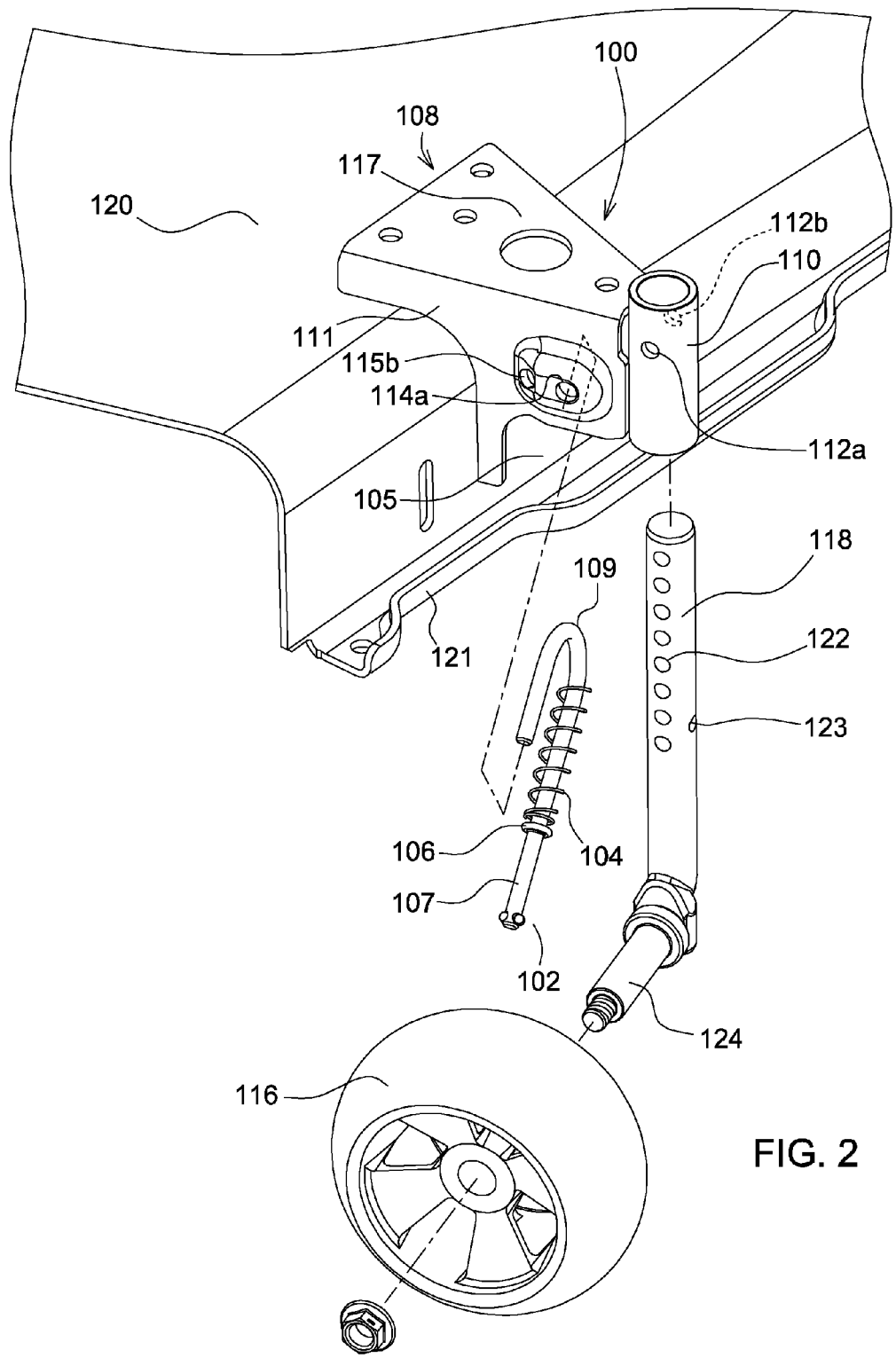
FIG. 2 is an exploded perspective view of a mower deck gauge wheel support before installation on a mower deck according to a preferred embodiment of the invention.
Figure 3:
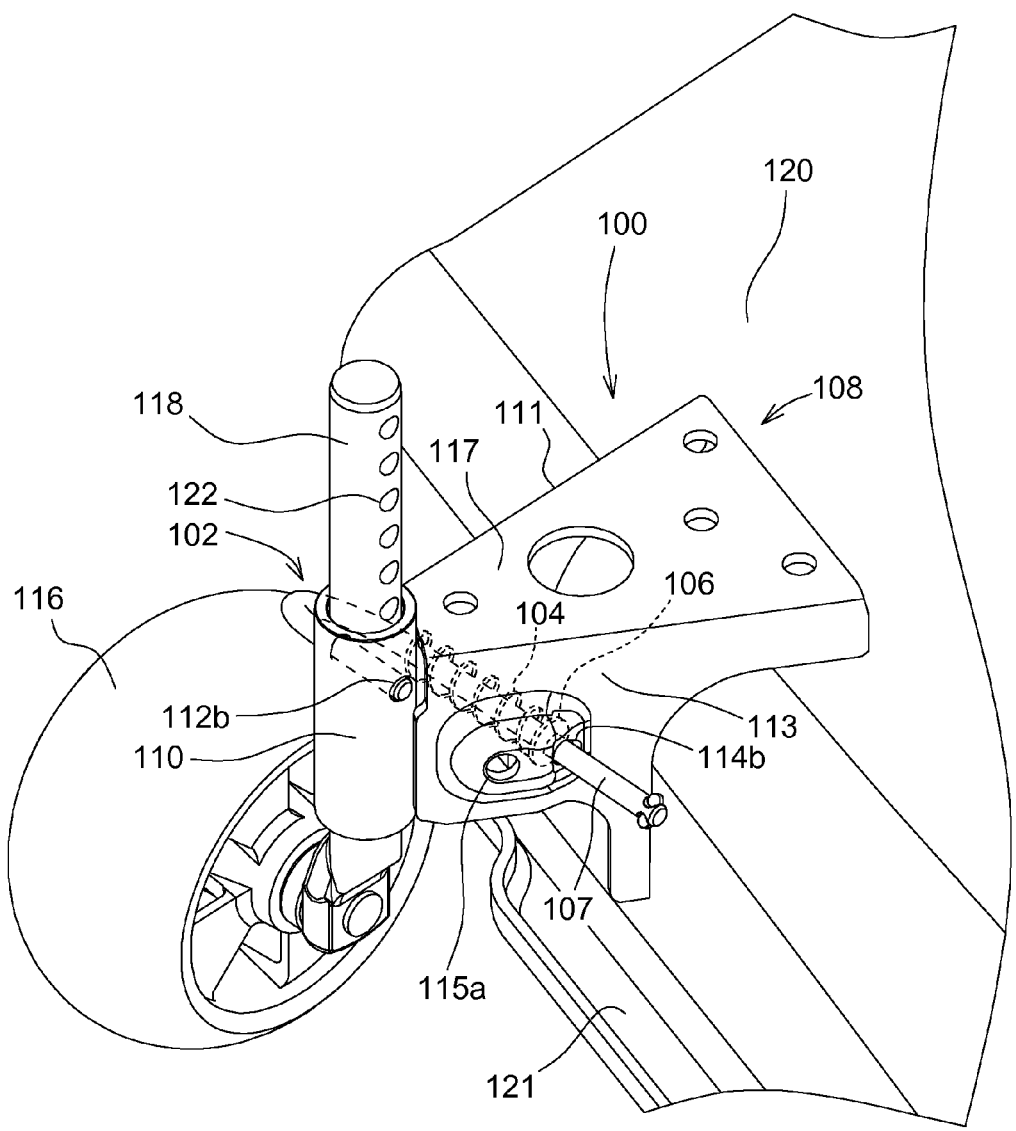
FIG. 3 is a perspective view of a mower deck gauge wheel support partially installed on a mower deck according to a preferred embodiment of the invention.

In one embodiment shown in FIGS. 1-3, mower deck gauge wheel support 100 may be provided on mower deck 120. A mower deck typically may have several mower deck gauge wheel supports, each having essentially the same construction. Each mower deck gauge wheel support may include a single removable J-pin 102 that an operator may use to set gauge wheel height by engaging a first leg 105 of the J-pin with wheel shaft 118. A second leg 107 of the J-pin retains the J-pin in place by engaging holes in bracket 108.

In one embodiment, bracket 108 may be mounted and/or welded to the top surface and outer wall of the mower deck. For example, bracket 108 may be welded near each corner of a typical mower deck. Each bracket may be a one-piece sheet metal member with a V-shape including outside wall 111 facing the left or right side of the mower deck, inside wall 113 facing the inside or center of the mower deck, and bridging surface 117 between the two walls. Outside wall 111 may be in a first vertical plane generally parallel to the forward/reverse direction of mowing, and inside wall 113 may be in a second vertical plane that is non-parallel to the first plane, but intersects the first plane outside the mower deck's side skirt 121.

In one embodiment, sleeve 110 may have a generally vertical alignment and may be attached and/or welded to the inside and outside walls of the bracket outside the mower deck's side skirt. The sleeve may have a pair of holes 112a, 112b on its opposing sides. Wheel shaft 118 may be inserted into and through the vertical sleeve. The wheel shaft may have a plurality of holes 122 vertically spaced from each other adjacent the wheel shaft's upper end, and perpendicular to the forward/reverse direction of mowing. To set the gauge wheel at a desired height so it may rotate in a forward/reverse mowing direction, the first end 105 of J-pin 102 may be inserted through one of a plurality of holes 122 through wheel shaft 118, and through holes 112a, 112b in opposing sides of the vertical sleeve. Gauge wheel 116 may be rotatably mounted to hub 124 extending generally horizontally from the lower end of the wheel shaft.

In one embodiment, J-pin 102 may have a first shorter leg 105 a second longer leg 107, and a curved intermediate portion 109 connecting between the two legs. The curved intermediate portion may serve as a handle or grip used to change the gauge wheel height. The second longer leg 107 may be inserted through a first pair of holes 114a, 114b in bracket 108. For example, hole 114a may be through outside wall 111, and hole 114b may be through inside wall 113. When the second leg of the J-pin is inserted through the first pair of holes 114a, 114b, the J-pin may be generally perpendicular to the forward/reverse direction of mowing. The first pair of holes 114a, 114b also may be aligned perpendicular to the outside wall 111 of the bracket. For example, hole 114a may be located closer to vertical sleeve 110, and hole 114b may be located closer to the mower deck. Optionally, bracket 108 also may include a second pair of holes 115a, 115b that may be aligned perpendicular to the inside wall of the bracket.

In one embodiment, coil spring 104 may be coiled around the second leg 107 of J-pin 102 to bias the J-pin into engagement with the wheel shaft and bracket, and to retain the J-pin in place. The coil spring may be positioned within bracket 108 under bridging surface 117, extending between flange 106 on the J-pin and bracket wall 111. The coil spring helps retain the J-pin in engagement with wheel shaft 118, and in engagement with bracket 108. The coil spring retains the J-pin by preventing or limiting retraction of the second longer end 107 of the J-pin from holes 114, 115 in bracket 108, unless increased force is applied to the J-pin.

In one embodiment, coil spring 104 prevents or limits how far J-pin 102 can be retracted to slightly more than the sleeve diameter but less than the gap between the pair of holes 114a, 114b, unless greater force is applied. The operator may retract the J-pin from wheel shaft 118 to change gauge wheel height. For example, the operator may retract the J-pin by pulling the intermediate curved portion 109 of the J-pin until the first short end 105 of the J-pin exits hole 122 in wheel shaft 118 and holes 112a, 112b in opposing sides of sleeve 110. Pulling out the J-pin from the wheel shaft compresses coil spring 104 between flange 106 and bracket wall 111. Unless greater force is applied, the coil spring retains and prevents or limits retraction of the second longer end 107 of the J-pin from holes 114, 115 in bracket 108. The operator may move wheel shaft 118 up or down relative to sleeve 110, reinsert the first shorter end 105 of the J-pin back through holes 112a, 112b in opposing sides of the sleeve 112, and through another hole 122 in the wheel shaft.

In one embodiment, to set the gauge wheel to rotate in a sideways direction for installation or removal of the deck from the vehicle, the operator may insert J-pin 102 through hole 123 in the wheel shaft. Hole 123 may be offset 90 degrees from holes 122, so that hole 123 is parallel to the forward/reverse mowing direction. The short leg 105 of J-pin 102 may be inserted through hole 123 in the wheel shaft, and holes 112a, 112b in opposing sides of the sleeve.

Alternative embodiments of the mower deck gauge wheel support may include a pin having a different shape, instead of a J-pin, having a first end that engages the wheel shaft at a desired cutting height, and a second end that is engaged by and retained by a coil spring within the bracket. The mower deck gauge wheel support eliminates any retainer that must be fastened or welded to the mower deck racket for retaining the pin and spring in place in the wheel shaft, and retaining the pin when it is retracted. As a result, the mower deck gauge wheel support has lower cost, lower parts count, and reduced assembly time.

Having described the preferred embodiment, it will become apparent that various modifications can be made without departing from the scope of the invention as defined in the accompanying claims.

The invention claimed is:

1. A mower deck gauge wheel support, comprising:
   a bracket having an inside wall, an outside wall, and a vertical sleeve attached to the inside and outside walls;
   a wheel shaft inserted into the sleeve and having an upper end with a first set of vertically spaced holes, a second hole offset from the first set of vertically spaced holes, and a lower end with a gauge wheel mounted thereto; and
   a J-pin having a first leg insertable through one of the first set of holes in the wheel shaft and a second leg insertable through a first pair of holes through the inside and outside walls of the bracket to align the gauge wheel to rotate in a first direction, the first leg insertable through the second hole in the wheel shaft and the second leg insertable through a second pair of holes through the inside and outside walls of the bracket to align the gauge wheel to rotate in a second direction, and a spring retaining the second leg of the J-pin in the bracket.

2. The mower deck gauge wheel support of claim 1 wherein the spring is located around the second leg of the J-pin within the bracket.

3. The mower deck gauge wheel support of claim 1 wherein the J-pin includes a flange on the second leg thereof.

4. The mower deck gauge wheel support of claim 1 wherein the first set of holes in the wheel shaft are perpendicular to a forward/reverse direction of mowing, and the second hole is offset 90 degrees from the first set of holes.

5. The mower deck gauge wheel support of claim 1 wherein the first pair of holes through the inside and outside walls of the bracket are perpendicular to a forward/reverse direction of mowing, and the second pair of holes are angularly offset from the first pair of holes.

6. A mower deck gauge wheel support, comprising:
   a bracket supporting a wheel shaft in a vertical sleeve;
   a gauge wheel rotatably mounted to a lower end of the wheel shaft; and
   a J-pin having a first end insertable through any of a first set of holes in the wheel shaft so the gauge wheel may be set at a plurality of different heights to rotate in a forward/reverse mowing direction, and insertable through a second hole that is offset from the first set of holes so the gauge wheel may rotate in a sideways direction; the J-pin having a second end insertable through a first pair of holes in the bracket if the first end is in any of the first set of holes, and insertable through a second pair of holes in the bracket if the first end is in the second hole; and having a spring within the bracket to bias and retain the J-pin to the bracket.

7. The mower deck gauge wheel support of claim 6 wherein the first end of the J-pin is a short end and the second end is a long end, and further comprising a curved intermediate portion between the first and second ends.

8. The mower deck gauge wheel support of claim 6 wherein the spring is a coil spring around the second end of the J-pin.

9. A mower deck gauge wheel support of claim 6 wherein the J-pin is positioned substantially perpendicular to a forward/reverse direction of mowing if the first end is in any of the first set of holes and is offset angularly if the first end is in the second hole.

10. A mower deck gauge wheel support, comprising:
    a one-piece sheet metal bracket mounted to a mower deck, and having a sleeve mounted thereto outside a skirt of the mower deck;
    a wheel shaft inserted through the sleeve; and
    a J-pin having a first end that engages a first set of holes in the wheel shaft so a gauge wheel can rotate in a first direction at a desired cutting height, and engages a second hole in the wheel shaft so the gauge wheel can rotate in a second direction, and a second end that is engaged by and retained by a coil spring between a first pair of holes or a second pair of holes in the bracket.

11. The mower deck gauge wheel support of claim 10 wherein the coil spring biases the second end of the J-pin into the first pair of holes or the second pair of a pair of holes in the bracket.

12. The mower deck gauge wheel support of claim 10 wherein the one-piece sheet metal bracket includes a first wall, a second wall, and a bridging surface between the first and second walls.

13. The mower deck gauge wheel support of claim 10 wherein the coil spring is coiled between a flange on the second end of the J-pin and a wall of the bracket.

\* \* \* \* \*